(12) United States Patent
Averill

(10) Patent No.: US 10,569,606 B2
(45) Date of Patent: Feb. 25, 2020

(54) PLUG FOR UPPER COUPLER OF TRAILER

(71) Applicant: Strick Trailers, LLC, Fairless Hills, PA (US)

(72) Inventor: Caleb Averill, Decatur, IN (US)

(73) Assignee: Strick Trailers, LLC, Fairless Hills, PA (US)

( * ) Notice: Subject to any disclaimer, the term of this patent is extended or adjusted under 35 U.S.C. 154(b) by 207 days.

(21) Appl. No.: 15/816,286

(22) Filed: Nov. 17, 2017

(65) Prior Publication Data
US 2019/0152281 A1    May 23, 2019

(51) Int. Cl.
| B60D 1/60 | (2006.01) |
| F16B 19/00 | (2006.01) |
| F16B 21/07 | (2006.01) |
| B60D 1/01 | (2006.01) |

(52) U.S. Cl.
CPC ............ B60D 1/605 (2013.01); F16B 19/002 (2013.01); F16B 19/004 (2013.01); F16B 21/076 (2013.01); B60D 1/015 (2013.01)

(58) Field of Classification Search
CPC ....... B60D 1/605; B60D 1/015; F16B 19/002; F16B 19/004
See application file for complete search history.

(56) References Cited

U.S. PATENT DOCUMENTS

| D247,529 S | 3/1978 | Klees | |
| 4,301,629 A | 11/1981 | Farr | |
| 4,938,524 A * | 7/1990 | Straub | B61D 17/10 |
| | | | 280/423.1 |
| 5,020,205 A | 6/1991 | Wridt | |
| 5,116,357 A | 5/1992 | Eberbach | |
| 5,852,854 A * | 12/1998 | Pierrot | B29C 44/1228 |
| | | | 24/297 |
| 8,616,403 B2 * | 12/2013 | Hisadomi | B60K 15/03 |
| | | | 220/562 |
| 9,120,509 B2 * | 9/2015 | Iwahara | B62D 25/24 |
| 2005/0082787 A1 * | 4/2005 | Dick | B62D 49/005 |
| | | | 280/415.1 |
| 2012/0187131 A1 * | 7/2012 | Claucherty | B60K 15/03 |
| | | | 220/562 |
| 2015/0151800 A1 * | 6/2015 | Bennett | B62D 53/085 |
| | | | 280/438.1 |
| 2015/0224835 A1 * | 8/2015 | Ehrlich | B60D 1/01 |
| | | | 280/423.1 |
| 2016/0176446 A1 * | 6/2016 | Kanie | B62D 25/24 |
| | | | 296/1.06 |

* cited by examiner

Primary Examiner — Jacob D Knutson
Assistant Examiner — Marlon A Arce
(74) Attorney, Agent, or Firm — Keith Swedo

(57) ABSTRACT

A plug for insertion into a through hole of a king pin coupler plate of a trailer includes a body defining an axial direction and having an outer surface defining a perimeter with a distance around the perimeter. A plurality of pliable ears extend from the outer surface. The ears are each individually aligned in the axial direction. The ears each have a width that is less than ten percent of the distance around the perimeter of the outer surface of the body.

10 Claims, 6 Drawing Sheets

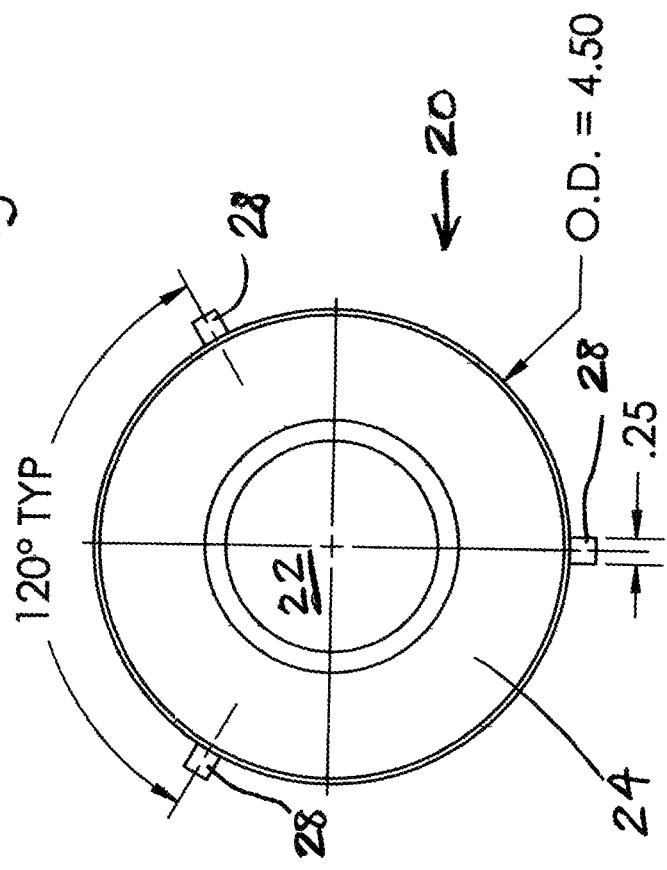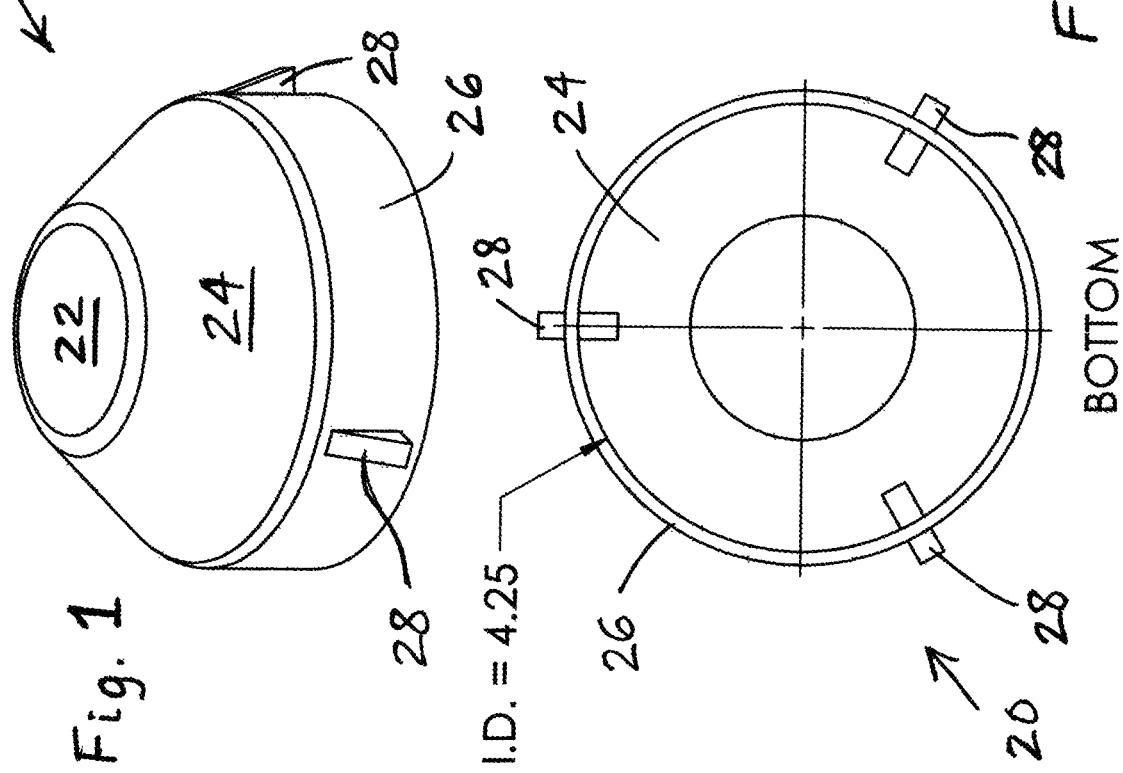

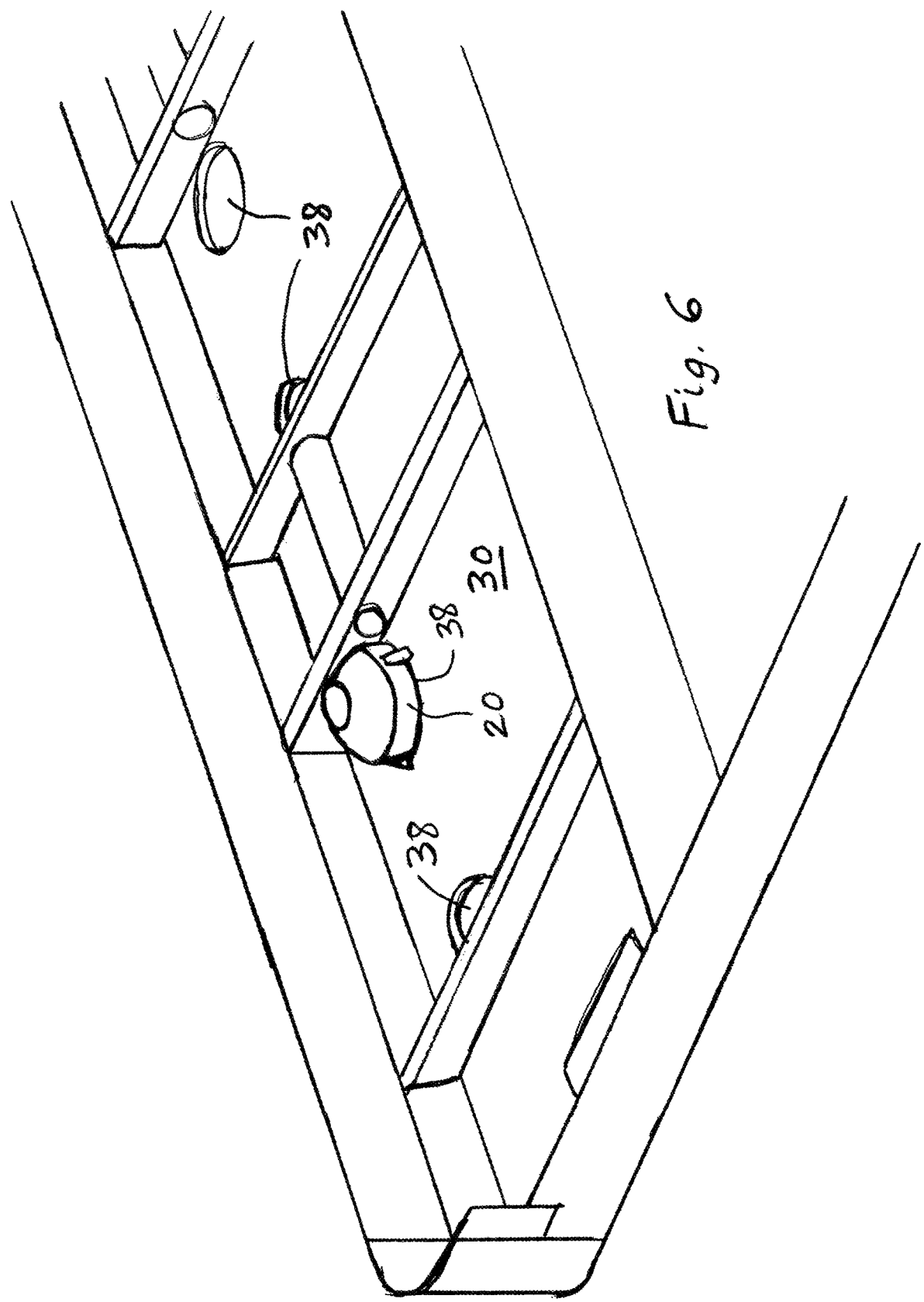

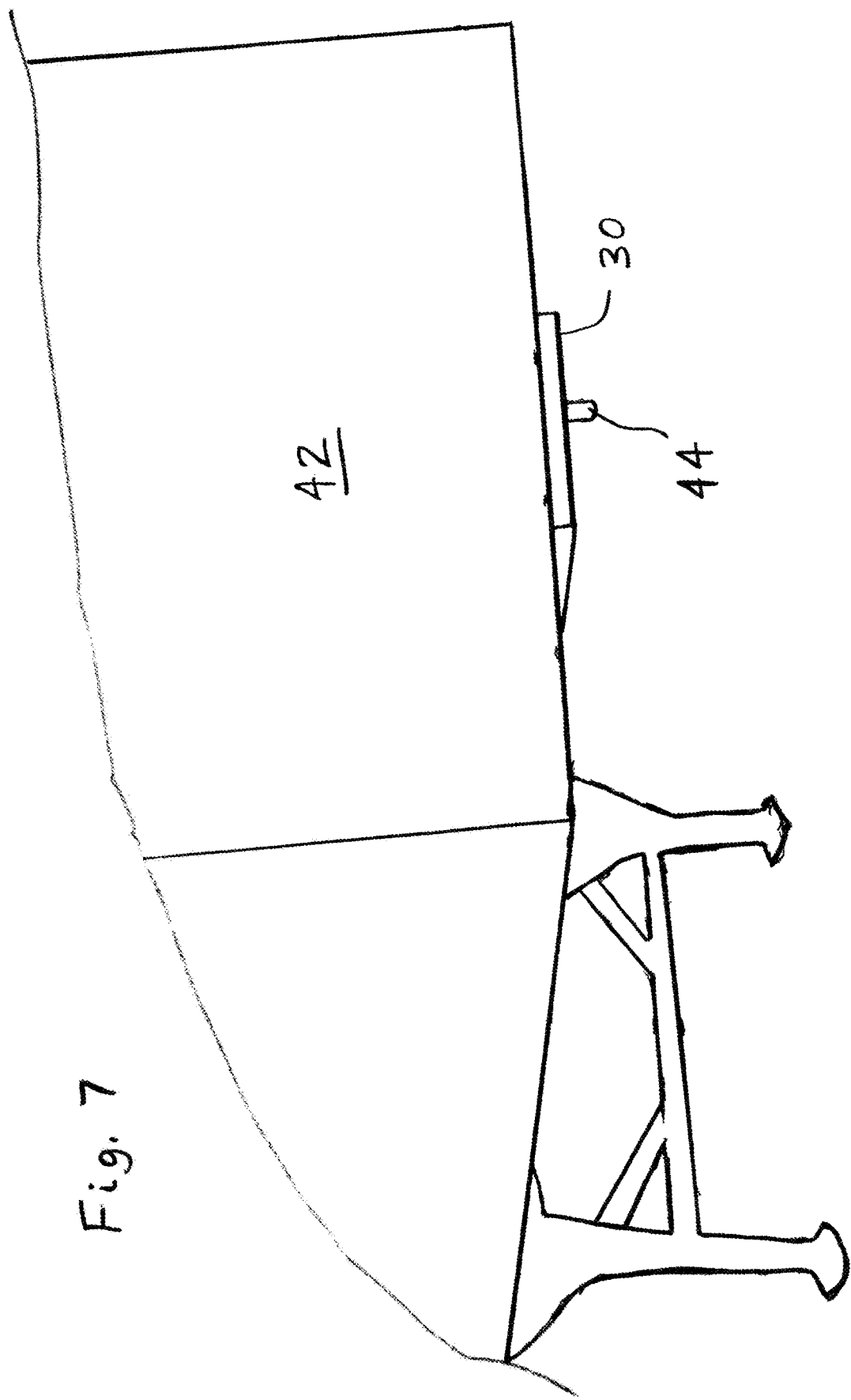

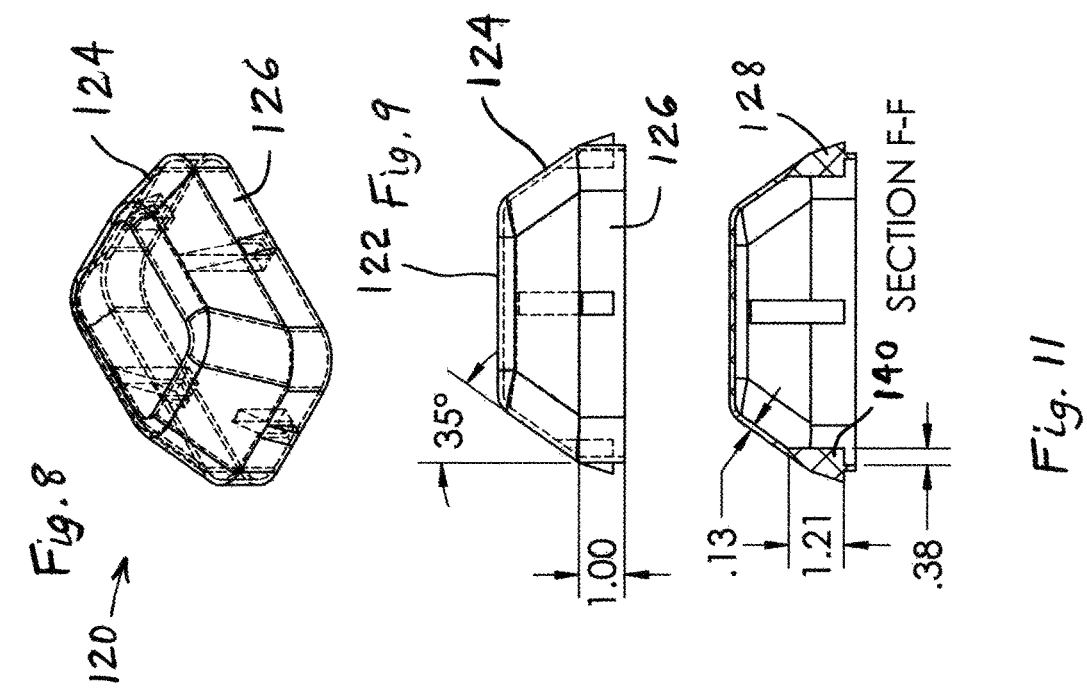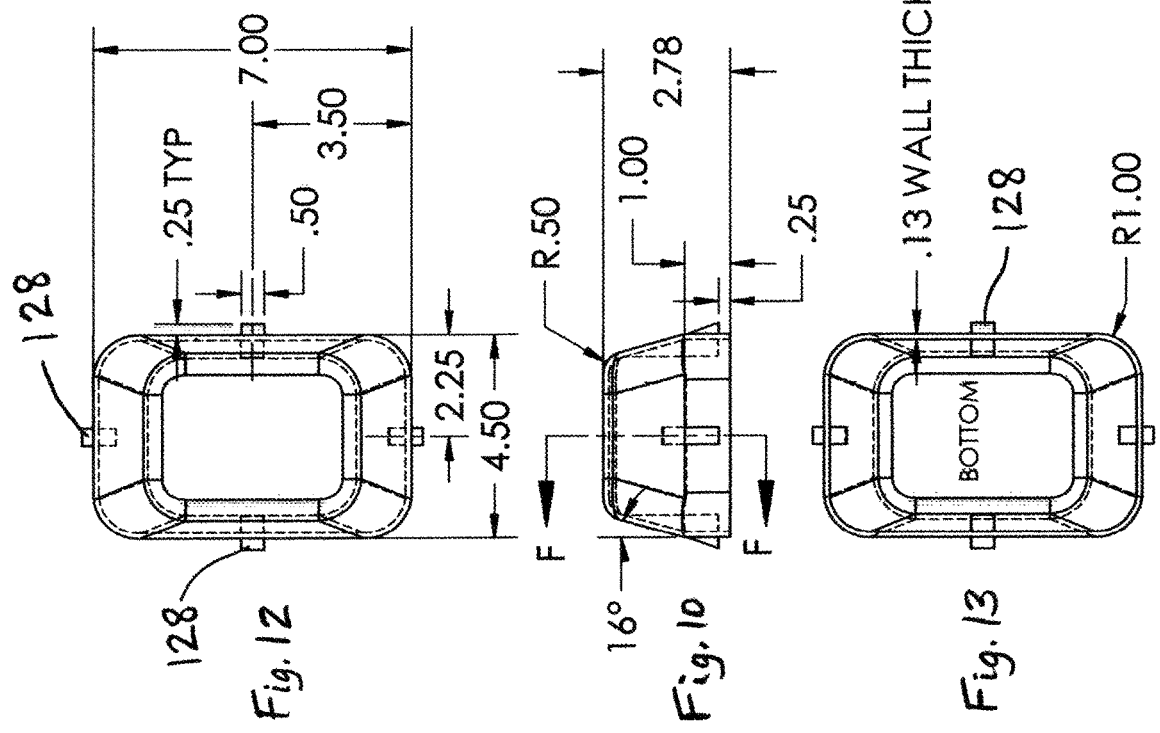

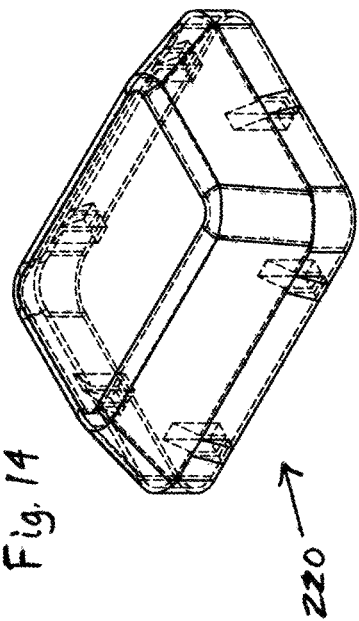
Fig. 14
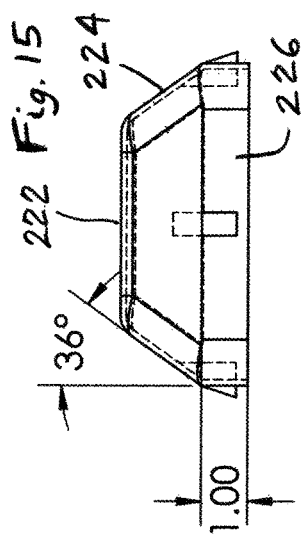
Fig. 15
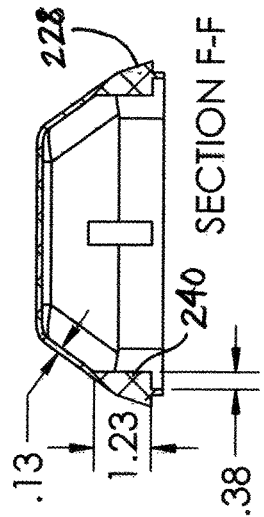
Fig. 17 SECTION F-F
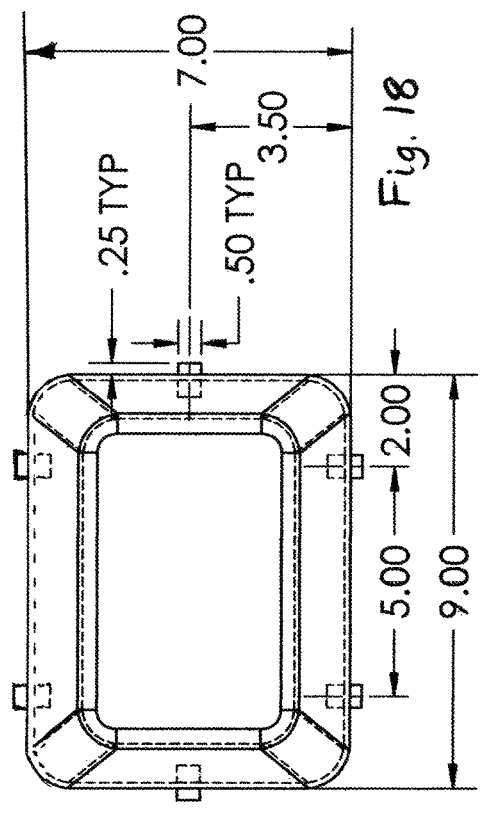
Fig. 18
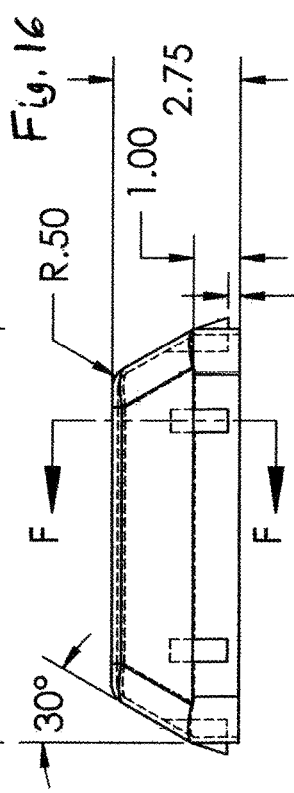
Fig. 16
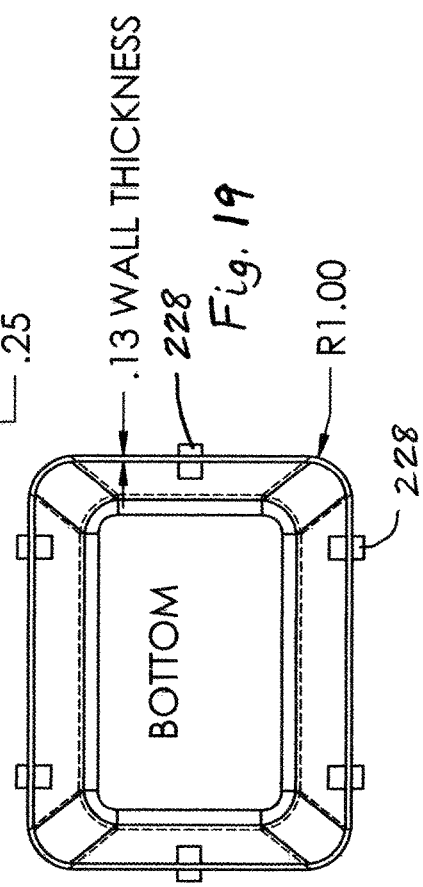
Fig. 19

PLUG FOR UPPER COUPLER OF TRAILER

BACKGROUND

The present invention relates to a trailer, container and other transport vehicle and, more particularly, to an upper coupler or "king pin" of such a trailer, container or transport vehicle. The king pin couples the trailer to the truck that tows the trailer. The vertically-oriented king pin extends through a hole in a horizontally-oriented upper coupler plate which supports electrical lines and air lines that extend between the truck and the trailer. The steel upper coupler plate includes other through holes through which the electrical lines and pneumatic lines may be accessed.

A problem is that objects may fall out of these holes. In particular, the wiring harnesses and pneumatic lines may fall out of the holes. The excess wiring may be bundled up and pushed into a rectangular shaped chamber that is inside the hole and at least partially defined by the coupler plate. As may be readily appreciated, harnesses may occasionally fall through the holes and become snagged on the truck, causing warranty and functionality issues.

Another problem is that foreign objects and materials, such as water, snow, salt, bees, birds, etc., may enter the chamber through these holes. It has been found that excess moisture and particularly road salts cause corrosion inside of the couplers. It has also been found that bees, birds, and other pesky animals like to make their homes inside of these holes. This causes a hassle when the trailer has to be worked on, especially in the front area.

SUMMARY

The present invention may provide a plastic plug that is easily installed into a through hole in the upper coupler plate associated with the king pin of a trailer. The plug may be pushed into the hole from the underside of the coupler plate.

The plug may have three triangular and axially oriented ears that are spaced apart by 120 degrees around the circumference of the plug. As the plug is pushed into the hole in the steel coupler plate, the three triangular ears are compressed by the circular edge of the hole. As the plug is pushed slightly farther through the hole, the ears may "pop out" or snap into place once they clear the edge of the hole. Thus, the ears prevent the plug from falling out through the hole in the direction opposite to the direction in which the plug was pushed through the hole. Farther upward movement of the plug may be prevented by the top of the plug running into or engaging a top steel plate that is above and parallel to the coupler plate. Movement of the plug in sideways or lateral direction may be prevented by the roughly quarter inch length of the plug that is still inside the hole through which the plug was pushed. The plug may be removed from the chamber and from the hole by prying the edges of the plug with a screwdriver or similar object in order to bend the triangular ears out and around the steel coupler plate or bottom plate.

In addition to having the ears, the inventive plug is also different from other known plugs in that the inventive plug does not have a flange at its bottom end. Known plugs have a flange that would extend beyond the bottom of the steel coupler plate. This extension of the plug would interfere with, or be scraped, by the truck's fifth wheel, which glides or pushes underneath the coupler plate when coupling with the trailer. Anything that extends beyond the bottom of the hole would snag on the truck during the coupling process and/or during operation of the truck and trailer.

The invention comprises, in one form thereof, a plug for insertion into a through hole of a king pin coupler plate of a trailer. The plug includes a body defining an axial direction and having an outer surface defining a perimeter with a distance around the perimeter. A plurality of pliable ears extend from the outer surface. The ears are each individually aligned in the axial direction. The ears each have a width that is less than ten percent of the distance around the perimeter of the outer surface of the body.

The invention comprises, in another form thereof, a plug for insertion into a through hole of a king pin coupler plate of a trailer. The plug includes a cylindrical body defining an axial direction and having a cylindrical outer surface with a circumference. A plurality of pliable ears extend from the outer surface. The ears are each individually aligned in the axial direction. The ears each have a width that is less than ten percent of the circumference of the outer surface of the cylindrical body. The ears are offset from a bottom end of the cylindrical body. A frusto-conical portion is attached to an upper end of the cylindrical body and tapers toward an upper end of the frusto-conical portion.

The invention comprises, in yet another form thereof, a trailer arrangement including a king pin coupler plate having an upper surface and a through hole. A top plate is mounted substantially parallel to and above the coupler plate. A bottom surface of the top plate is separated from the upper surface of the coupler plate. A plug engages the bottom surface of the top plate. The plug includes a body defining an axial direction and having an outer surface defining a perimeter with a distance around the perimeter. The body has a bottom portion received in the through hole of the coupler plate. A plurality of pliable ears extend from the outer surface of the body. The ears are each individually aligned in the axial direction. The ears each have a width that is less than ten percent of the distance around the perimeter of the outer surface of the body. A bottom end of each ear engages the upper surface of the coupler plate.

An advantage of the present invention is that the plug installed in the coupler plate may prevent wires and other objects from falling through the holes.

Another advantage of the present invention is that the plug does not include any portion that extends beyond the bottom of the coupler plate, such as a flange, which could be snagged by moving parts under the coupler plate.

Yet another advantage of the present invention is that the ears of the plug prevent the plug from falling through the through hole that is being plugged. Yet the ears are small and flexible enough to allow the plug to be removed from the through hole from the bottom.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 1 is a perspective view of one embodiment of a plug of the present invention;

FIG. 2 is a top view of the plug of FIG. 1;

FIG. 3 is a bottom view of the plug of FIG. 1;

FIG. 6 is a perspective view of one embodiment of a plug of the present invention inserted into a coupler plate;

FIG. 7 is a fragmentary perspective view of the coupler plate of FIG. 6 mounted on a trailer;

FIG. 8 is perspective view of another embodiment of a plug of the present invention;

FIG. 9 is a front view of the plug of FIG. 8;

FIG. 10 is a side view of the plug of FIG. 8;

FIG. 11 is a cross-sectional view along line F-F in FIG. 10;

FIG. 12 is a top view of the plug of FIG. 8;

FIG. 13 is a bottom view of the plug of FIG. 8;

FIG. 14 is perspective view of yet another embodiment of a plug of the present invention;

FIG. 15 is a front view of the plug of FIG. 14;

FIG. 16 is a side view of the plug of FIG. 14;

FIG. 17 is a cross-sectional view along line F-F in FIG. 16;

FIG. 18 is a top view of the plug of FIG. 14; and

FIG. 19 is a bottom view of the plug of FIG. 14.

Figure 5:
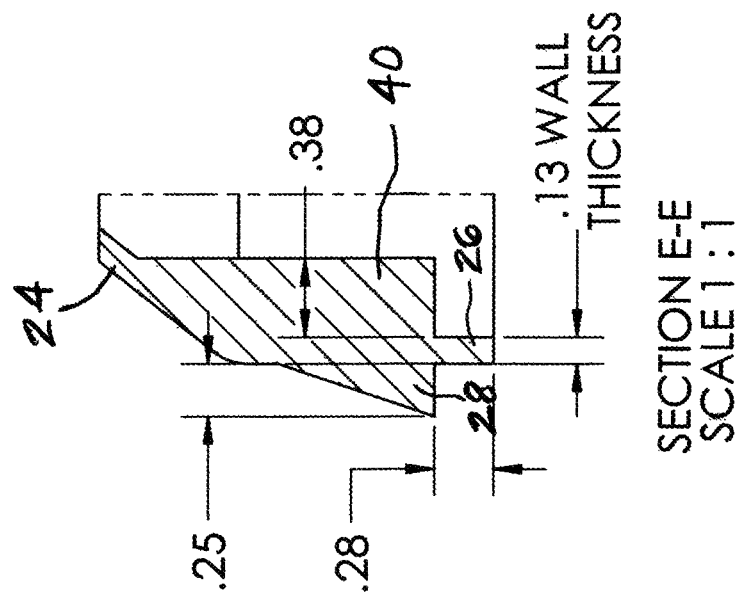
FIG. 5 is a cross-sectional view along line E-E in FIG. 4.

Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Referring to the drawings, wherein like numerals indicate like elements, FIG. 1 illustrates one embodiment of a pliable or flexible plug 20 of the present invention which may be made of plastic, rubber, or another similarly pliable material. Plug 20 includes a top surface 22, a frusto-conical portion 24, and a cylindrical body portion 26. Evenly spaced by 120 degrees around the outer surface of cylindrical body portion 26 are three triangular ears 28, only two of which are visible in FIG. 1.

As shown in FIG. 2, an outer diameter of cylindrical body portion 26 may be about 4.5 inches, and a width of each ear 28 may be about 0.25 inch. Thus, a circumference of cylindrical body portion 26 may be about 14.14 inches, and the width of each ear 28 may be less than 2% of the circumference of cylindrical body portion 26.

As shown in FIG. 3, plug 20 may be hollow with an open bottom end. The wall thickness of cylindrical body portion 26 may be about 0.125 inch, and the inner diameter of cylindrical body portion 26 may be about 4.25 inches.

Figure 4:
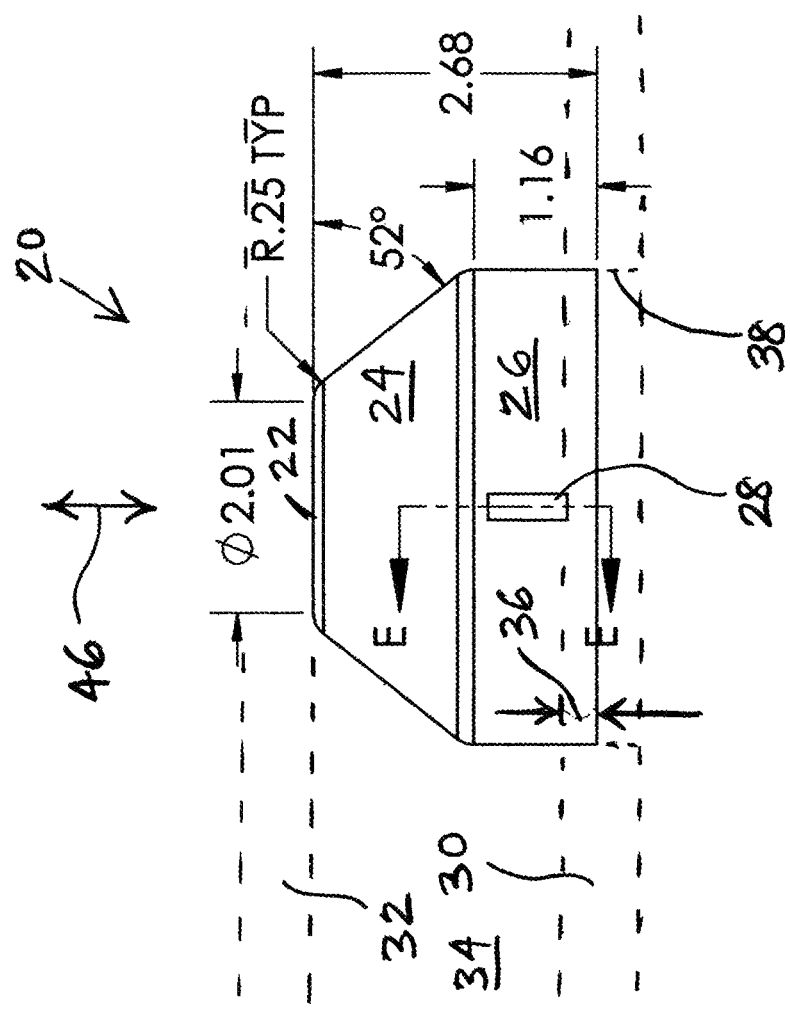
FIG. 4 is a side view of the plug of FIG. 1.

As shown in FIG. 4, a diameter of top surface 22 may be about 2.01 inches, and a radius at the circular edge of top surface 22 may be about 0.25 inch. A height of plug 20 may be about 2.68 inches, and a height of cylindrical body portion 26 may be about 1.16 inches. Frusto-conical portion 24 may descend down from top surface 22 at an angle of about 52 degrees relative to a horizontal direction. Ears 28 may be aligned in, or oriented in, axial directions 46 that are defined by cylindrical body portion 26 and that are perpendicular to coupler plate 30 and top plate 32.

As best shown in FIG. 4, a width or diameter of plug 20 does not increase (i.e., is nonincreasing) in axial directions 46 above and below ears 28. That is, a width or diameter of plug 20 either stays the same or decreases in axial directions 46 above and below ears 28. Notably, plug 20 does not include a flange on its bottom end that might extend below through hole 38.

When installed in a trailer, plug 20 may be sandwiched between a coupler plate 30 and a top plate 32. Thus, most of plug 20 may be disposed in a chamber 34 defined between coupler plate 30 and top plate 32. However, a bottom section of cylindrical body portion 26, having a height of about 0.28 inch as indicated at 36, may be received in a through hole 38 in coupler plate 30. Ears 28 may be aligned in, or oriented in, axial directions 46 that are perpendicular to coupler plate 30 and top plate 32.

As shown in FIG. 5, a length of an ear 28 in a radial direction may be about 0.25 inch. Each ear 28 may be radially aligned with a respective rib 40 having a length of about 0.38 inch extending radially inward from the wall of cylindrical body portion 26.

FIG. 6 illustrates plug 20 inserted into a through hole 38 in coupler plate 30. Other through holes 38 in coupler plate 30 are also illustrated. Other plugs 20 may be respectively inserted into each of through holes 38. It is to be understood that top plate 32 is omitted from FIG. 6 for clarity of illustration.

FIG. 7 illustrates coupler plate 30 mounted on a trailer 42. A king pin 44 extends downwardly through coupler plate 30. The present invention is not restricted to a trailer, but more broadly relates to the construction of cargo containers and transport vehicles, including trailer bodies adapted to be hauled by tractor units (not shown). The terms "trailer", "container", "cargo container" and "transport vehicle" are used interchangeably herein and each such term is meant to designate a partially-closed or closed, hollow structure for carrying cargo. The invention may also be applied to truck bodies, which may get mounted to trucks directly and are not coupled via a hitch. Although truck bodies may not have king pins, they may have through holes which may be plugged by the plug of the invention.

During use, plug 20 may be inserted into a through hole 38 from the bottom side. Ears 28 and body portion 26 may pliably deform while ears 28 pass through through hole 38. Ears 28 may then spring outward and snap into their unbiased state upon exiting through hole 38. Thus, ears 28 engage the upper surface of coupler plate 30 and prevent plug 20 from falling down through through hole 38. Plug 20 may be removed from through hole 38 by reaching up through through hole 38 and prying the edges of body portion 26 with a screwdriver or similar tool to thereby bend the triangular ears 28 around and out through hole 38.

FIGS. 8-13 illustrate another embodiment of a flexible or pliable plug 120 of the invention which may be made of plastic, rubber, or another similarly pliable material. Plug 120 has a generally rectangular shape, which may match the size and shape of a corresponding through hole in the coupler plate. Plug 120 includes a top surface 122, a pyramidal portion 124, and a rectangular body portion 126. Evenly spaced by 90 degrees around the outer surface of rectangular body portion 126 are four axially-aligned, triangular ears 128.

As shown in FIG. 9, two smaller opposing portions of pyramidal portion 124 are oriented at angles of about 35 degrees relative to a vertical plane. A height of rectangular body portion 126 is about 1.00 inch.

As shown in FIG. 10, a radius between top surface 122 and pyramidal portion 124 may be about 0.50 inch. A total height of plug 120 may be about 2.78 inches. Two larger opposing portions of pyramidal portion 124 are oriented at angles of about 16 degrees relative to a vertical plane. Rectangular body portion 126 extends about 0.25 inch below ears 128.

As shown in FIG. 11, a height of ears 128 is about 1.21 inches. The wall thickness of pyramidal portion 124 may be about 0.13 inch. Each ear 128 may be radially aligned with a respective rib 140 having a length of about 0.38 inch extending inward from the wall of rectangular body portion 126.

As shown in FIG. 12, a width of rectangular portion 126 along a smaller side may be about 4.50 inches, and a width of rectangular body portion 126 along a larger side may be about 7.00 inches. Thus, the distance around a perimeter of rectangular body portion 126 may be approximately between 21 and 23 inches. Each ear 128 has a width of about 0.50 inch, and a length of about 0.25 inch. Thus, each ear 128 may have a width that is less than 2.5% of the distance around a perimeter of rectangular body portion 126.

As shown in FIG. 13, plug 120 may be hollow with an open bottom end. A radius between sides of rectangular body portion 126 may be about 1.00 inch. A wall thickness of rectangular body portion 126 may be about 0.13 inch. Other features of plug 120 are substantially similar to the features of plug 20, and thus are not described in detail herein in order to avoid needless repetition.

FIGS. 14-19 illustrate yet another embodiment of a flexible or pliable plug 220 of the invention which may be made of plastic, rubber, or another similarly pliable material. Plug 220 has a generally rectangular shape, which may match the size and shape of a corresponding through hole in the coupler plate. Plug 220 includes a top surface 222, a pyramidal portion 224, and a rectangular body portion 226. Spaced around the outer surface of rectangular body portion 226 are six axially-aligned, triangular ears 228.

As shown in FIG. 15, two larger opposing portions of pyramidal portion 224 are oriented at angles of about 36 degrees relative to a vertical plane. A height of rectangular body portion 226 is about 1.00 inch.

As shown in FIG. 16, a radius between top surface 222 and pyramidal portion 224 may be about 0.50 inch. A total height of plug 220 may be about 2.75 inches. Two smaller opposing portions of pyramidal portion 224 are oriented at angles of about 30 degrees relative to a vertical plane. Rectangular body portion 226 extends about 0.25 inch below ears 228.

As shown in FIG. 17, a height of ears 228 is about 1.23 inches. The wall thickness of pyramidal portion 224 may be about 0.13 inch. Each ear 228 may be radially aligned with a respective rib 240 having a length of about 0.38 inch extending inward from the wall of rectangular body portion 226.

As shown in FIG. 18, a width of rectangular body portion 226 along a smaller side may be about 7.00 inches, and a width of rectangular body portion 226 along a larger side may be about 9.00 inches. Thus, the distance around a perimeter of rectangular body portion 226 may be approximately between 30 and 32 inches. Each ear 228 has a width of about 0.50 inch, and a length of about 0.25 inch. Thus, each ear 228 may have a width that is less than 2.0% of the distance around a perimeter of rectangular body portion 226.

As shown in FIG. 19, plug 220 may be hollow with an open bottom end. A radius between sides of rectangular body portion 226 may be about 1.00 inch. A wall thickness of rectangular body portion 226 may be about 0.13 inch. Other features of plug 220 are substantially similar to the features of plug 20, and thus are not described in detail herein in order to avoid needless repetition.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A plug for insertion into a through hole of a king pin coupler plate of a trailer, said plug comprising:
    a cylindrical body defining an axial direction and having a cylindrical outer surface with a circumference;
    a plurality of pliable ears extending from the outer surface, the ears each being individually aligned in the axial direction, the ears each having a width that is less than ten percent of the circumference of the outer surface of the cylindrical body, the ears being offset from a bottom end of the cylindrical body, wherein a bottom portion of the cylindrical body extends from the ears to the bottom end of the cylindrical body and is sized to be received in the through hole of the king pin coupler plate while the ears touch the coupler plate and the bottom end of the cylindrical body is in the through hole and does not extend beyond a bottom of the through hole; and
    a frusto-conical portion attached to an upper end of the cylindrical body and tapering toward an upper end of the frusto-conical portion.

2. The plug of claim 1 wherein a distance between an upper surface of the frusto-conical portion and bottom ends of the ears in the axial direction substantially matches a distance between an upper surface of the coupler plate and a bottom surface of a king pin top plate of the trailer.

3. The plug of claim 1 wherein the ears are each triangular when viewed along a width direction of the ear.

4. The plug of claim 1 wherein the ears each have a height more than two times greater than the width of the ear.

5. The plug of claim 1 wherein said plurality of pliable ears include between three and six ears.

6. The plug of claim 1 wherein the body is pliable.

7. A trailer arrangement, comprising:
    a king pin coupler plate having an upper surface and a through hole;
    a top plate mounted substantially parallel to and above the coupler plate, a bottom surface of the top plate being separated from the upper surface of the coupler plate;
    a plug engaging the bottom surface of the top plate, the plug including: a body defining an axial direction and having an outer surface defining a perimeter with a distance around the perimeter, the body having a bottom portion received in the through hole of the coupler plate; and
    a plurality of pliable ears extending from the outer surface of the body, the ears each being individually aligned in the axial direction, the ears each having a width that is less than ten percent of the distance around the perimeter of the outer surface of the body, a bottom end of each said ear engaging the upper surface of the coupler plate, wherein each of the ears has the shape of a right triangle when viewed along a width direction of the ear, with a right angle of the triangle at the bottom of the ear and adjacent to the body.

8. The arrangement of claim 7 wherein the ears each have a width that is less than three percent of the distance around the perimeter of the outer surface of the body.

9. The arrangement of claim 7 wherein the plug lacks a flange.

10. The arrangement of claim 7 wherein a bottom side of each said ear is substantially flat and has a length in a direction away from the body, the length being at least 0.125 inch.

\* \* \* \* \*